United States Patent
James-Hymes

[11] Patent Number: 5,087,203
[45] Date of Patent: Feb. 11, 1992

[54] EDUCATIONAL TOOL KIT

[76] Inventor: Virginia H. James-Hymes, 33 Hummel Rd., New Paltz, N.Y. 12561, now by change of name from Virginia H. James

[21] Appl. No.: 509,712

[22] Filed: Apr. 16, 1990

[51] Int. Cl.$^5$ ............................................... G09B 1/00
[52] U.S. Cl. ..................................... 434/84; 401/288; 401/286; 434/87; 434/81; 33/565
[58] Field of Search ......................... 434/81, 84, 87, 88; 33/565, 663, 562; 401/268, 19, 22, 24, 288, 286; 415/405

[56] References Cited

U.S. PATENT DOCUMENTS

| | | | |
|---|---|---|---|
| 148,251 | 3/1874 | Fowler | 434/87 X |
| 650,544 | 5/1900 | Von Pallich | 401/35 X |
| 679,398 | 7/1901 | Sabin et al. | 401/268 |
| 807,817 | 12/1905 | Gilbert | 33/563 X |
| 938,735 | 11/1909 | Wolfgram et al. | 401/288 |
| 1,065,610 | 6/1913 | Hooker | 401/288 |
| 1,082,934 | 12/1913 | Coriell | 401/288 |
| 1,202,626 | 10/1916 | Watts | 33/565 X |
| 1,228,163 | 5/1917 | Arents | 434/87 X |
| 1,794,671 | 3/1931 | Conwill | 401/268 X |
| 2,090,186 | 8/1937 | Corbett | 434/87 X |
| 2,245,339 | 6/1941 | Harris et al. | 33/563 X |
| 3,029,464 | 4/1962 | Springmeier | 401/288 X |
| 4,306,868 | 12/1981 | Hankins | 434/85 |
| 4,944,625 | 7/1990 | Futter et al. | 401/184 X |

Primary Examiner—Richard J. Apley
Assistant Examiner—L. Thomas
Attorney, Agent, or Firm—Leon Gilden

[57] ABSTRACT

A teaching kit organization includes a series of rigid planar stencils, including variously configured openings directed therethrough. Chalk application members are provided, including a chalk stick, an eraser, and an applicator bottle to direct chalk through the stencil openings to apply a predetermined configuration to a rearwardly positioned board to provide visual aid and assistance in positioning variously configured shapes upon a blackboard and the like for use as a teaching tool. The applicator bottle is formed as a resiliently deformable body directing a predetermined quantity of chalk dust through a forwardly positioned conduit, whereupon a surrounding perimeter of bristles positioned about the perimeter opening of the conduit and associated applicator slot formed within an applicator head of the bottle directs the chalk dust in a smooth continuous pattern therefrom. A modification of the bottle includes selective compartments within the bottle selectively utilized in association with the aforenoted conduit by a valve associated with each compartment.

3 Claims, 5 Drawing Sheets

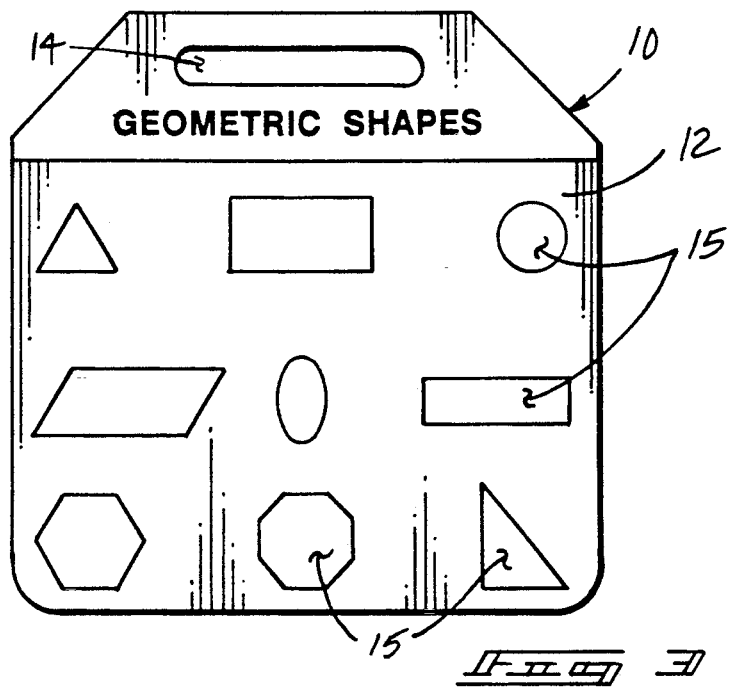
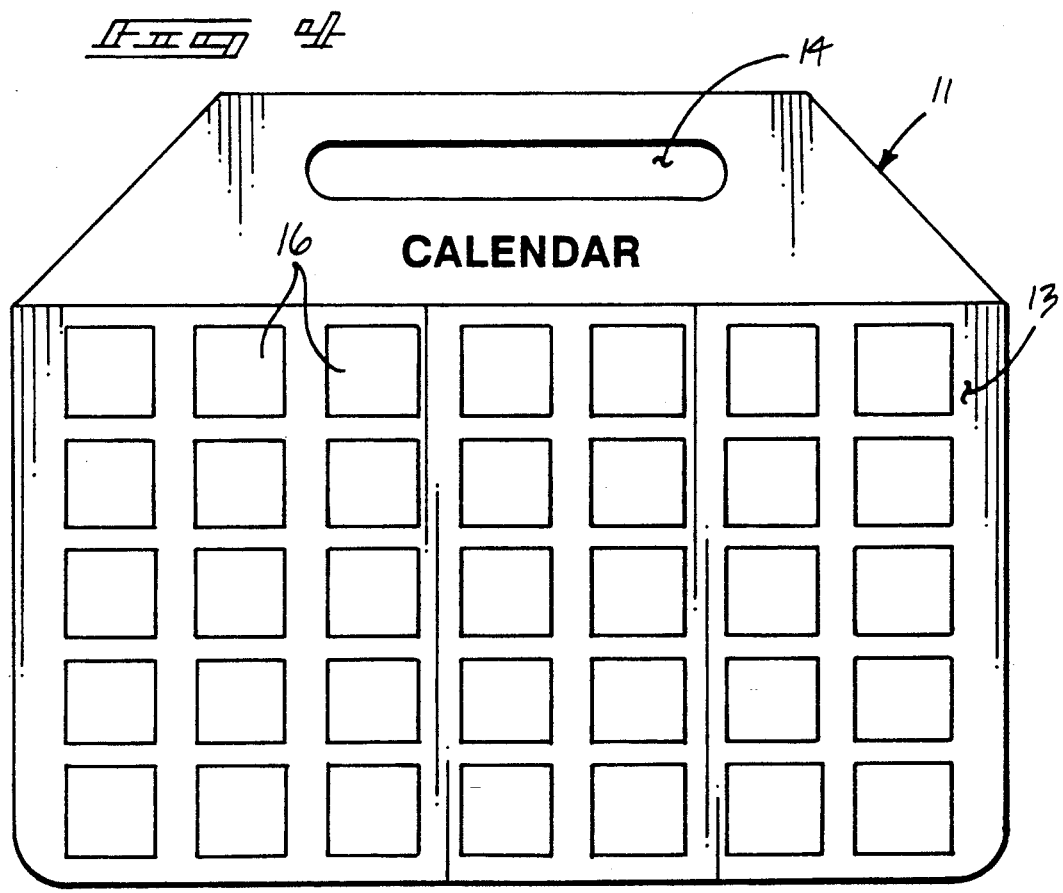

GEOMETRIC SHAPES

EDUCATIONAL TOOL KIT

BACKGROUND OF THE INVENTION

1. Field of the Invention

The field of invention relates to teaching tools, and more particularly pertains to a new and improved educational teaching tool kit wherein the same is utilized to impart variously configured chalk patterns onto a blackboard for use as a visual aid in teaching.

2. Description of the Prior Art

In a teaching environment, the requirement to provide visual representation of various components such as calendars, geometric shapes, clocks and the like is required in teaching children relative knowledge associated with such respective shapes. Imparting such shapes to an associated blackboard in a teaching environment is a time consuming and inexact skill. The instant invention attempts to overcome deficiencies of the prior art by providing a readily manipulatable and operative teaching tool to enable imparting of such shapes to an associated blackboard surface. Examples of prior art stencil type tools may be found in U.S. Pat. No. 3,900,956 to Furuoka wherein a disk is mounted upon a plate, and wherein rotation of the disk relative to the plate provides various composite patterns for use in a drawing environment.

U.S. Pat. No. 3,888,009 to White, et al. sets forth a kit for designing and making costumes, wherein various outlines are presented through a sheet to permit directing of such outlines to an underlying cloth or other flexible surface to impart such shapes thereto.

U.S. Pat. No. 4,563,154 to Vandervort, et al. sets forth a drawing stencil tablet wherein variously configured geometric patterns are positionable upon an underlying surface to permit imparting of such shapes to a drawing surface.

U.S. Pat. No. 4,026,030 to Kuever, et al. sets forth a drawing template wherein variously sliding of one plate relative to the other provides various lengths of various shapes such as circles and the like.

U.S. Pat. No. 4,242,802 to Jenner, et al. sets forth a stencil plate providing the outline of a front, side, and top view of a human body, wherein various apertures are directed through the outlines to permit a swing about each joint defined by each aperture to provide various body attitudes in configuration.

As such, it may be appreciated that there continues to be a need for a new and improved educational teaching tool kit wherein the same addresses both the problems of ease of use, as well as effectiveness in organization and in this respect, the present invention substantially fulfills this need.

SUMMARY OF THE INVENTION

In view of the foregoing disadvantages inherent in the known types of teaching aids now present in the prior art, the present invention provides an educational teaching tool kit wherein the same permits imparting of various geometric patterns upon an underlying surface. As such, the general purpose of the present invention, which will be described subsequently in greater detail, is to provide a new and improved educational teaching tool kit which has all the advantages of the prior art teaching tool apparatus and none of the disadvantages.

To attain this, the present invention provides a teaching kit organization including a series of rigid planar stencils, including variously configured openings directed therethrough. Chalk application members are provided, including a chalk stick, an eraser, and an applicator bottle to direct chalk through the stencil openings to apply a predetermined configuration to a rearwardly positioned board to provide visual aid and assistance in positioning variously configured shapes upon a blackboard and the like for use as a teaching tool. The applicator bottle is formed as a resiliently deformable body directing a predetermined quantity of chalk dust through a forwardly positioned conduit, whereupon a surrounding perimeter of bristles positioned about the perimeter opening of the conduit and associated applicator slot formed within an applicator head of the bottle directs the chalk dust in a smooth continuous pattern therefrom. A modification of the bottle includes selective compartments within the bottle selectively utilized in association with the aforenoted conduit by a valve associated with each compartment.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved educational teaching tool kit which has all the advantages of the prior art teaching aids and none of the disadvantages.

It is another object of the present invention to provide a new and improved educational teaching tool kit apparatus which may be easily and efficiently manufactured and marketed.

It is a further object of the present invention to provide a new and improved educational teaching tool kit which is of a durable and reliable construction.

An even further object of the present invention is to provide a new and improved educational teaching tool kit which is susceptible of a low cost of manufacture with regard to both materials and labor, and which accordingly is then susceptible of low prices of sale to the consuming public, thereby making such educational teaching tool kits economically available to the buying public.

Still yet another object of the present invention is to provide a new and improved educational teaching tool kit which provides in the apparatuses and methods of the prior art some of the advantages thereof, while simultaneously overcoming some of the disadvantages normally associated therewith.

Still another object of the present invention is to provide a new and improved educational teaching tool kit wherein the same permits selective imparting of various geometric positions upon a rearwardly positioned blackboard surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic of a first stencil utilized by the instant invention.

FIG. 4 is a top orthographic view of an example of a second stencil utilized by the instant invention.

DESCRIPTION OF THE PREFERRED EMBODIMENT

Figure 1:
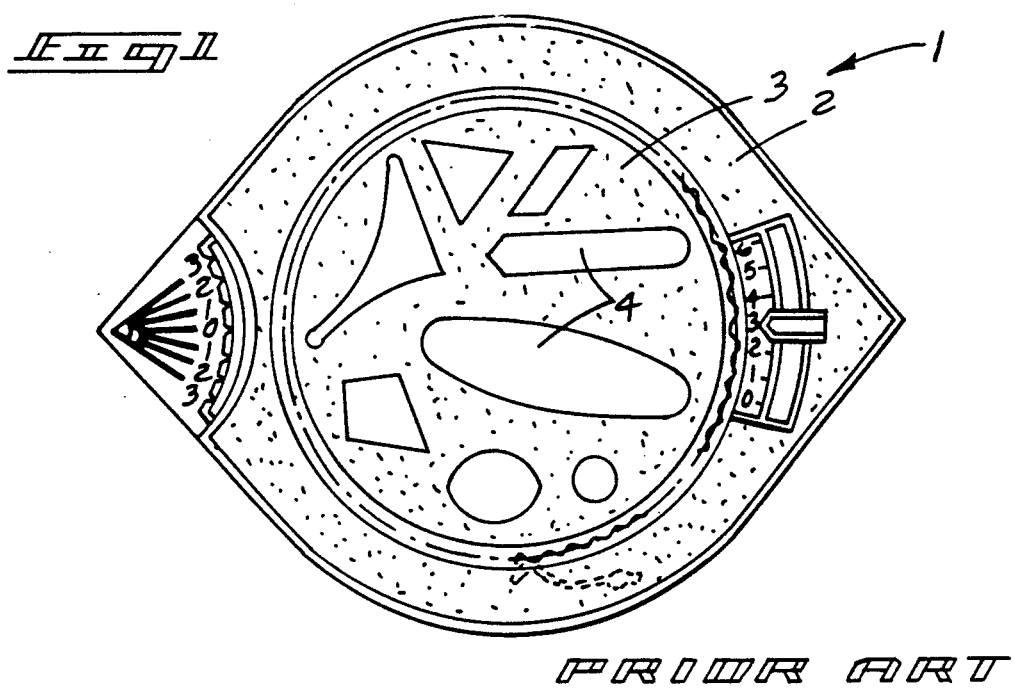
FIG. 1 is a top orthographic view of a prior art stencil apparatus.

With reference now to the drawings, and in particular to FIGS. 1 to 10 thereof, a new and improved educational teaching tool kit embodying the principles and concepts of the present invention and generally designated by the reference numerals 10-35 will be described.

Figure 2:
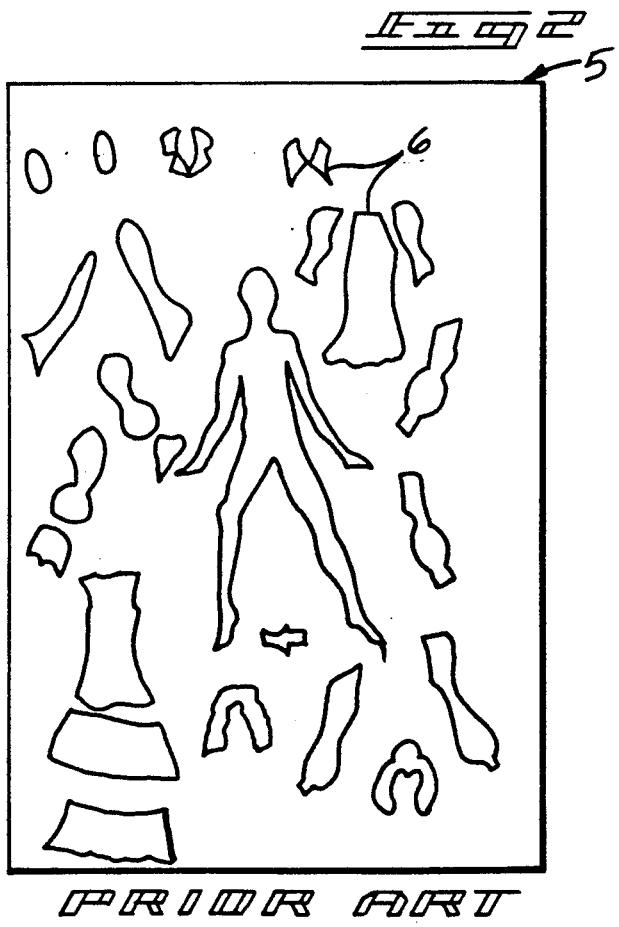
FIG. 2 is a top orthographic view of a further example of a prior art stencil organization.

FIG. 1 illustrates a prior art stencil organization member 1, wherein a disk 3 is rotatably mounted relative to a plate 2 to provide variously oriented composite geometric configurations 4 within the disk. FIG. 2 illustrates a further prior art stencil member 5, wherein various clothing patterns 6 are provided to impart various clothing shapes for design and development upon an underlying surface.

More specifically, the educational teaching tool kit of the instant invention essentially comprises a plurality of stencil plates illustrated as a first and second stencil plate 10 and 11, per FIGS. 3 and 4 respectively. The first stencil plate 10 includes a first planar face 12, including a series of variously configured geometric shapes 15 directed as apertures through-extending the stencil plate, with a handle slot 14 mounted adjacent an upper terminal edge of the plate for ease of transport and manipulation in positioning of the plate adjacent an underlying surface, such as a chalk board (not shown). The second stencil plate 11 utilizes a second planar face 13, with a through-extending matrix of openings 16 therethrough to designate a calendar configuration for use as a teaching aid. Further, a comparable handle slot 14 is directed through-extending the stencil plate 11 for ease of manipulation and transport, as illustrated per FIG. 3. It is further contemplated that various such stencil plates be utilized, such as clock faces with a standard or digital configuration, a graph stencil utilizing orthogonally directed horizontal and vertical lines, various fractional shapes such as segments of geometric patterns of circles, rectangles and the like, various handwriting types such as manuscript, etc., maps, musical designations and the like. Accordingly, the first and second stencil plates 10 and 11 are representative of the myriad of stencils that may be utilized in imparting a geometric shape to an underlying surface, but utilizing the aforenoted through-extending handle slot 14 for ease of manipulation of the associated stencil.

Figure 5:
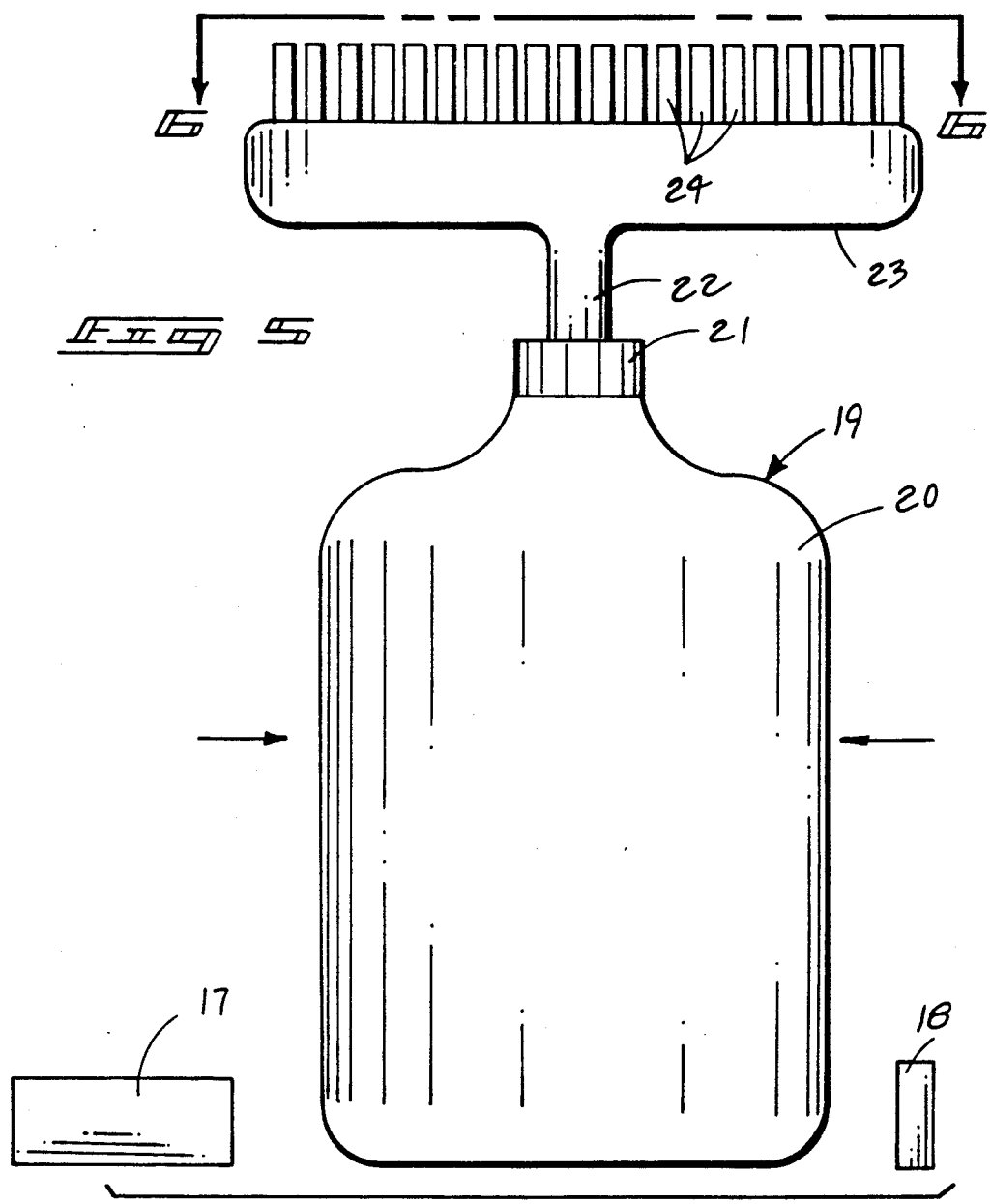
FIG. 5 is an orthographic side view, taken in elevation, of the chalk application member as utilized by the instant invention.
Figure 6:
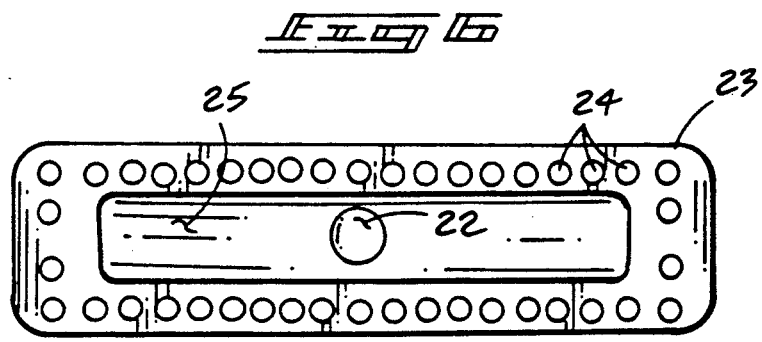
FIG. 6 is an orthographic view, taken along the lines 6—6 of FIG. 5, in the direction indicated by the arrows.

FIG. 5 illustrates the various implements utilized in imparting and directing chalk through the various openings, such as 15 and 16 as illustrated. A chalk eraser 17 may be utilized to direct a fog of articulate chalk dust through the openings to impart the aforenoted shapes to a rearwardly presented surface, as well as a conventional chalk stick 18 in combination with the chalk eraser, and a powdered chalk disperser 19. The powdered chalk dispenser includes a flexible polymeric container body 20 formed of memory retentent material to permit manual expressing of the contents of the container body through conduit 22. A removable cap 21 is removably mounted to an upper end of the body for replenishment of the chalk dispenser with a reservoir of a chalk powder. A chalk conduit 22 is in communication with the dispenser 19 and an upwardly oriented dispensing kit arranged orthogonally relative to the conduit 22 that is in turn orthogonally mounted to the upper surface of the cap 21 in a through-extending relationship. The dispensing head 23 includes a series of brush bristle tufts 24 directed upwardly and coextensively with an upper end surface of the dispensing head 23 defining an elongate dispensing slot 25 between the tufts 24. The elongate dispensing slot 25 is in communication, with the conduit 22 to direct the chalk dust through the slot 25 and apply a smooth even surface of such dust by use of the bristle tufts 24.

Figure 7:
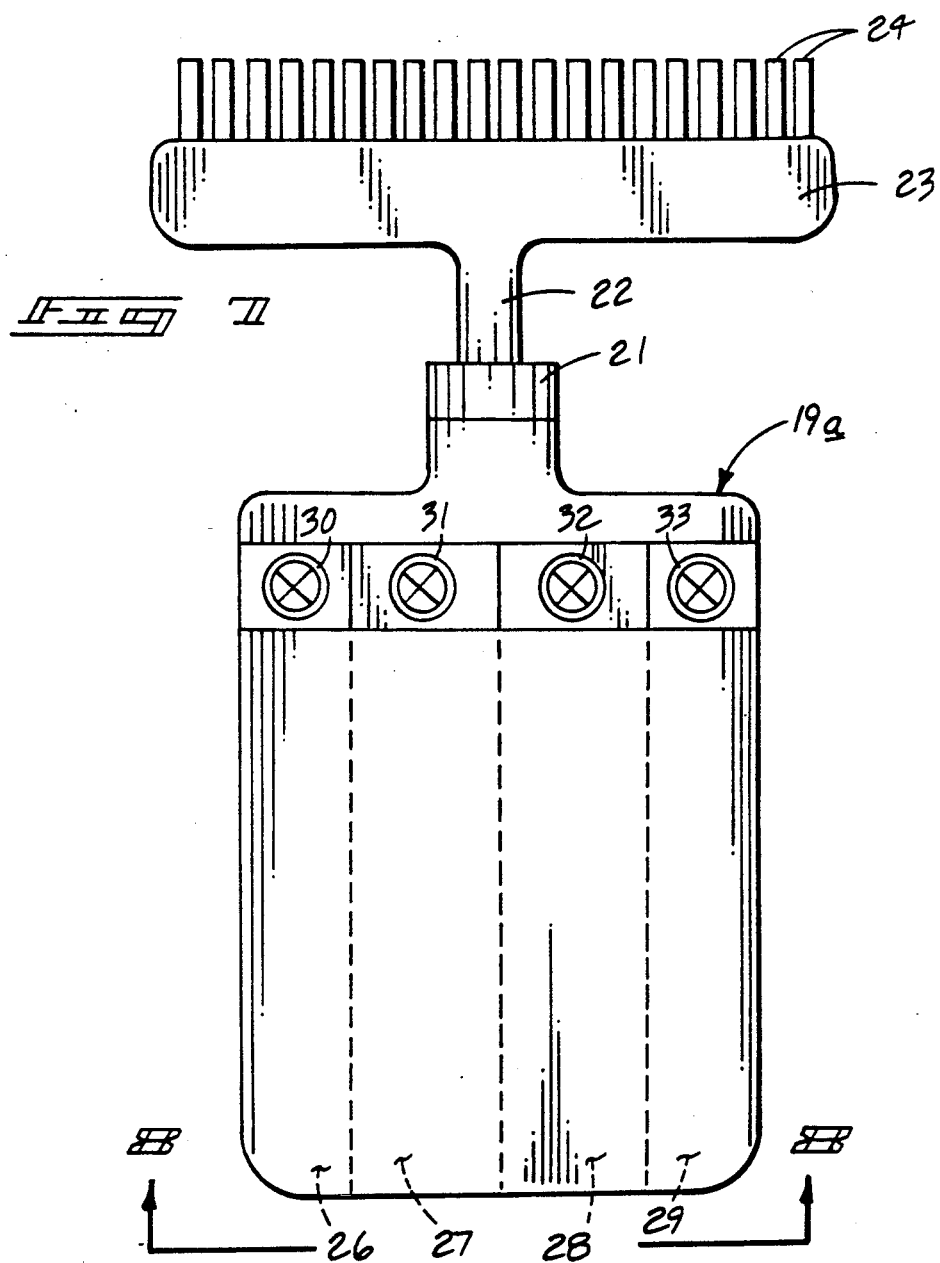
FIG. 7 is an orthographic side view, taken in elevation, of a modified chalk application member utilized by the instant invention.
Figure 8:
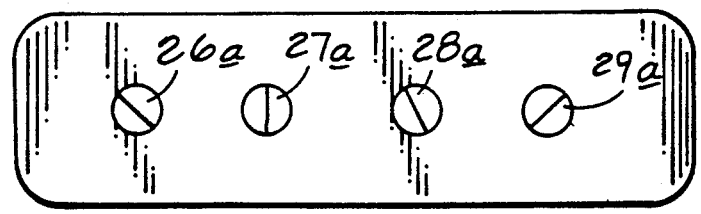
FIG. 8 is an orthographic view, taken along the lines 8—8 of FIG. 7, in the direction indicated by the arrows.

FIG. 7 illustrates a modified chalk dispenser 19a, wherein the flexible body is divided into a series of longitudinally aligned chambers defining a first chamber 26, a second chamber 27, a third chamber 28, and a fourth chamber 29 formed longitudinally and parallel relative to one another through the body of the dispenser that are selectively directed through the conduit 22 through a respective valving, including a first valve 30, a second valve 31, a third valve 32, and a fourth valve 33, each cooperative with the respective slotted manually manipulated first, second, third, and fourth chambers 26, 27, 28, and 29. Through the bottom surface of the body, a respective fill plug comprising a first, second, third, and fourth fill plug 26a, 27a, 28a, and 29a are associated with each respective first, second, third, and fourth chamber to provide replenishment of a chamber through the bottom surface of the body of the chalk dispenser. In this manner, variously colored chalk dust may be formed within each of the respective chambers to apply contrasting and high-lighting of the various geometric shapes directed through each of the aforenoted stencils.

Figure 9:
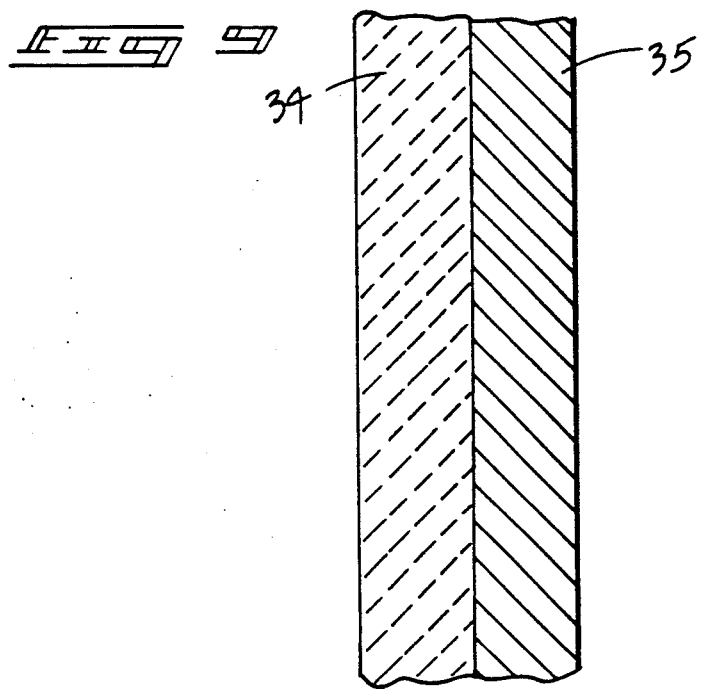
FIG. 9 is an orthographic cross-sectional view, taken along the lines 9—9 of FIG. 10, in the direction indicated by the arrows.
Figure 10:
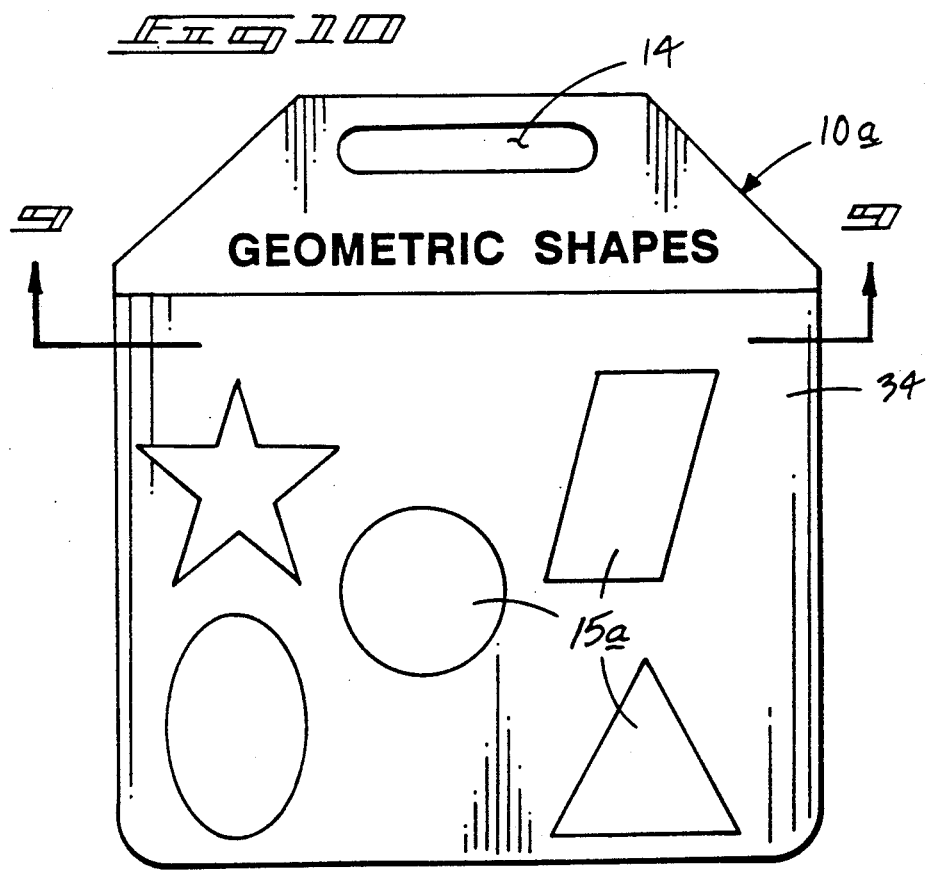
FIG. 10 is an orthographic top view of a further geometric stencil member utilized by the instant invention.

FIG. 9 illustrates the stencil defined as a further stencil plate 10a from which a further array of geometric shapes 15a is formed, including a forward slate plate member 34 laminated to and coextensive with a rigid metallic plate member 35 to impart rigidity and geometrical integrity to the stencil.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An educational teaching tool kit comprising, in combination,
  a plurality of stencil plates, including a first stencil plate and a second stencil plate, the first stencil plate including at least a rigid outer plate, the rigid outer plate including a series of first geometric shapes directed therethrough, and the second stencil plate including a further outer plate with a further matrix of geometric patterns directed therethrough,
  the first and second stencil plates each including a respective top edge, and each stencil plate including an elongate slot defining a handle directed through the first and second stencil plate adjacent the top edge, and
  further including chalk applicator means for directing chalk through the openings and further openings in the first and second stencil plate, and
  wherein the outer plate member comprises a plate member, and the outer plate member laminated to and coextensive with a rear plate member, the rear plate member defined as a rigid metallic plate member, with the openings and further openings formed through the respective first and second stencil plates coextensively formed through the rear plate member, and
  wherein the chalk applicator means includes a rigid chalk stick, an elongate chalk eraser, the chalk eraser defined by an elongate longitudinally aligned rectangular configuration, and a chalk dispenser, and
  wherein the chalk dispenser includes a flexible elongate polymeric body including a forward end and a rear end, the forward end including a removable cap mounted thereto, the removable cap including a chalk conduit directed through the cap mounted orthogonally thereto in communication with the container body, the chalk conduit including a longitudinally aligned elongate dispensing head mounted orthogonally to the chalk conduit spaced from the cap medially of the dispensing head.

2. A kit as set forth in claim 1 wherein the dispensing head includes an elongate slot, the elongate slot oriented orthogonally and medially bisected by the conduit, and a surrounding perimeter of brush bristle tufts mounted about the dispensing slot coextensively of the dispensing head arranged generally parallel to the chalk conduit.

3. A kit as set forth in claim 2 wherein the container body includes a first, second, third, and fourth chamber spaced interiorly of the container body longitudinally and arranged parallel relative to one another, each chamber including a respective first, second, third, and fourth removable plug directed through the rear end of the container body to permit selective filling of each chamber, and each first, second, third, and fourth chamber including a manually manipulatable valve positioned at a forward end of each chamber adjacent the chalk conduit to permit selective directing of a contrasting chalk dust contained within each chamber selectively through a respective valve.

* * * * *